United States Patent [19]

Azarowics

[11] 3,871,956

[45] Mar. 18, 1975

[54] MICROBIAL DEGRADATION OF PETROLEUM

[75] Inventor: Edward N. Azarowics, Vienna, Va.

[73] Assignee: Bioteknika International Inc., Alexandria, Va.

[22] Filed: Feb. 20, 1973

[21] Appl. No.: 333,707

Related U.S. Application Data

[63] Continuation-in-part of Ser. No. 43,226, June 3, 1970, Pat. No. 3,769,164.

[52] U.S. Cl.................. 195/2, 195/3 H, 195/28 R, 210/11
[51] Int. Cl............................................. C12b 1/00
[58] Field of Search........ 195/2, 3, 4, 28 R; 210/11, 210/15, DIG. 21

[56] References Cited
UNITED STATES PATENTS
3,634,227    1/1972    Patterson............................. 210/11

OTHER PUBLICATIONS
Little, A; Combating Pollution Created by Oil Spills, Report of Dept. of Transp., pp. 61–63, 88–91, 92 & 96–97, June 30, 1969.

Johnson, M; "Science," Vol. 155, pp. 1515–1519, Mar. 24, 1967.

Primary Examiner—Lionel M. Shapiro
Assistant Examiner—R. B. Penland
Attorney, Agent, or Firm—Stewart and Kolasch, Ltd.

[57] ABSTRACT

A process for the microbial degradation of petroleum or oily waste materials which comprises treating the petroleum or oily waste with a strain of *Nocardia corallina*, *Nocardia globerula*, *Nocardia opaca*, *Nocardia rubra* or *Nocardia paraffinae* for a sufficient time until degradation has been achieved. The microorganism strains employed have a broad spectrum of degradation capability and are capable of degrading crude petroleum as well as a variety of organic molecules, including aliphatic, aromatic and heterocyclic compounds.

12 Claims, No Drawings

MICROBIAL DEGRADATION OF PETROLEUM

CROSS-REFERENCE TO RELATED APPLICATION

This application is a continuation-in-part of copending application Ser. No. 43,226, filed on June 3, 1970, now U.S. Pat. No. 3,769,164, issued on Oct. 30, 1973.

BACKGROUND OF THE INVENTION

This invention relates to a process for the microbial degradation of crude petroleum, various oil fractions and oily wastes. More particularly, it relates to a method for degrading petroleum and oily substances, whether crude or refined, by means of microorganisms as a way of, for example, cleaning up oil spillage as it may occur on the open sea, inland fresh waters, sandy beaches, shingle beaches, rock-bound shorelines, boulder-strewn beaches, tidal pools and harbors and for cleaning and degrading various industrial effluent waste materials. The invention is also applicable for cleaning closed containers, such as, for example, tanker bottoms or storage tanks containing crude petroleum, heavy tar fractions, asphalts and heavy, viscous crude oil residues.

Environmental cleanup is of much concern to the country and to the world today. Air and water pollution are a major problem in today's technological society. As far as water pollution is concerned, oil spillage has become an increasing problem with the advent of offshore drilling and the transport of petroleum in very large tankers. Many proposals have been made for cleaning up and/or degrading such oil spillages, but none has been satisfactorily successful to date. Moreover, there is much public concern over the pollution problems caused by the discharge of effluent waste materials into waterways, and various governments are enacting much stricter standards regarding the contaminant or polluting composition of such effluents.

Ideally, the desired end result of oil or waste material degradation is to restore oil-pollution marine, benthic and littoral environments to habitable, ecologically clean environments. The use of material primarily of biological origin which are not only oil-degrading, but are also edible, beneficial and completely non-toxic to marine fauna and flora, would be especially advantageous. Synthetic detergents, emulsifying agents, organic solvents or other toxic products of the chemical process or the petrochemical industries, proposed heretofore, do not possess the advantages inherent in the use of materials of biological origin. In fact, the use of synthetic chemicals very often results in the massive killing of marine fauna and flora over a wide geographical area. Accordingly, most of the approaches used in the past, whether mechanical or chemical in nature, have been unsatisfactory.

One of the objects of the present invention is to provide an improved procedure for degrading and cleaning up oil spills on the open sea which overcomes the disadvantages and deficiencies of the prior art.

Another object of the present invention is to provide a process for the microbial degradation of petroleum, various oil fractions and oily wastes wherever desired, for example, as a means of cleaning up oil spills, for cleaning tanker holds or vessels or storage tanks containing undesirable petroleum crudes, heavy tar fractions, asphalts and heavy, viscous crude oil residues, or for cleaning up industrial effluents to the point where they may be discharged into the environment safely without fear of pollution in accordance with all government standards.

A further object of the invention is to provide a procedure for degrading various petroleum substances readily, efficiently and relatively economically using microorganisms which are completely non-toxic to marine fauna and flora, humans and animals.

A still further object of the invention is to provide microorganisms which are thus capable of degrading petroleum or various oil fractions as desired, leaving an edible and beneficial cell mass.

Yet another object of the invention is to provide a method for the degradation of oil wherein there is no need for the handling, transporting and storage of heavy, bulky equipment.

These and other objects and advantages of the present invention will become apparent to those skilled in the art from a consideration of the following specification and claims.

SUMMARY OF THE INVENTION

In accordance with the present invention, the above objectives are attained and a procedure for the microbial degradation of oil and petroleum has been discovered utilizing particular hydrocarbon-utilizing microorganisms. The distinct, unique advantages of the present invention are that the non-toxic microorganisms employed have a broad spectrum of degradation capability and all of the materials used are derived originally from edible substances which are not toxic. It is applicable equally to petroleum degradation and to other industrial wastes in general, such as effluents from food canning or preparing factories, paper mills, steel and aluminum mills, dairies and chemical plants discharging solvents, plasticizers, alcohols, aldehydes, ketones, organic acids, phenolics and other organic compounds into the environment.

The expression "petroleum" as used throughout this application is intended to designate crude petroleum as well as petroleum fractions and petroleum-derived products, such as aliphatic and aromatic hydrocarbons, alcohols, aldehydes, ketones, organic acids, phenols, naphthalenes, phenanthrenes, anthracenes, organic esters, etc. Thus, the term "petroleum" as used herein refers to organic carbon-containing compounds, including straight-and branched-chain alkanes (including paraffins of varying molecular weights) and other aliphatic compounds (including alicyclics such as cyclohexane) as well as aromatic heterocyclic and carbocyclic compounds. In industry, the term "oily waste" is used to designate effluents or mixtures which may contain one or more of the following components: (1) oils, (2) emulsifiers, (3) biocides, (4) algicides, (5) heat exchanger fluids, (6) hydraulic fluids, (7) polychlorinated biphenyls (PCB's), (8) brominated hydrocarbons, (9) dissolved solids, (10) suspended solids, (11) organic solvents (12) phenolics, (13) naphthenics, (14) aromatics, (15) coolants, (16) hydrogen sulfide, (17) sulfuric acid for emulsion breaking, (18) alkali for sulfuric acid neutralization, (19) butyl esters, (20) oleic acid, (21) mercaptans, (22) cutting oils, (23) bacterial loads in excess of $10^6$ bacteria per ml. of effluent, and (24) raw sewage. Oily wastes containing these kinds of materials can be and have been degraded by the particular microorganism strains disclosed and claimed in the present application. It is this surprising and unexpected effect of a broad-based and wide spectrum of degradation capability which constitutes the essential novel point in this invention, enabling an effective and practical method for the microbial degradation of petroleum and oily wastes.

The process of the present invention for use, for example, in cleaning up spilled oil, is a purely biological process in which selected microorganisms break down the crude petroleum or oily wastes and convert the mass of spilled oil or effluent material into a mass of edible, non-toxic living cells. This cell mass can be channeled into the food chain to feed higher forms of marine life and, thus, a very advantageous end result is achieved in addition to solving the problem of effluent or petroleum degradation. There is no need for ancillary cleanup operations when an oil spill is degraded in accordance with the invention and, as pointed out above, there is no need for the handling, transporting and storing of heavy, bulky equipment.

The following microorganisms, all completely novel and unobvious, are utilized in the present invention. They have been deposited in the American Type Culture Collection in Rockville, Maryland, and have been given the designated ATCC catalogue numbers:

Nocardia corallina N-301 ATCC 21504
Nocardia globerula N-39 ATCC 21505
Nocardia globerula N-45 ATCC 21506
Nocardia opaca N-300 ATCC 21507
Nocardia rubra N-2 ATCC 21508
Nocardia paraffinae N-114 ATCC 21509

The microbiological characteristics of each of these microorganisms are described in copending application Ser. No. 43,226, the disclosure of which is hereby expressly incorporated by reference.

Various media may be employed for handling these cultures, and they will grow on media with 100 percent marine water or with part marine water and part distilled water.

The following medium has been found to be quite satisfactory as a general use, all-purpose medium for, e.g., maintaining stock cultures:

All-Purpose Medium

| Heart infusion broth (Difco) | 23.0 | g. |
|---|---|---|
| Yeast extract | 3.0 | g. |
| Glycerol | 5.0 | ml. |
| Glucose | 5.0 | g. |
| Agar | 15.0 | g. |
| $H_2O$ (distilled) | 1000 | ml. |

The standard Bushnell-Haas Broth is used for the study of hydrocarbon utilization by microorganisms. The following medium has been found to be quite suitable for this purpose in connection with the microorganisms employed in the present invention:

| $MgSO_4$ | 0.2 | g. |
|---|---|---|
| $CaCl_2$ | 0.02 | g. |
| $KH_2PO_4$ | 1.0 | g. |
| $K_2HPO_4$ | 1.0 | g. |
| $NH_4NO_3$ | 1.0 | g. |
| $FeCl_3$ | 0.05 | g. |
| Bromthymol blue | 0.008 | g. |
| $H_2O$ (distilled) | 1000 | ml. |

The following medium has been found to be preferred and advantageous for the large-scale production of microbial cells:

| Cottonseed protein | 5.0 | g. |
|---|---|---|
| $NH_4NO_3$ | 2.5 | g. |
| $(NH_4)_2HPO$ | 2.5 | g. |
| $MgSO_4$ | 0.2 | g. |
| $K_2HPO_4$ | 1.0 | g. |
| Crude petroleum | 5.0 | ml. |
| Marine salt | 35.0 | g. |
| Tap water | 1000 | ml. |

Instead of the marine salt and tap water, native sea water can be used in the above medium. Aeration is provided to supply oxygen to the fermenter vessel or tank. Generally, the microbial cells are harvested after about 4 to 6 days of cultivation. To make up a supply of microorganisms, a large batch vessel or fermenter is seeded with a young culture equivalent to about 5 to 8 percent of the total capacity of the fermenter. If necessary, an antifoam agent can be employed, for example, Dow Antifoam A.

Hence, either a syntheric synthetic medium or a natural nutrient medium is suitable for the growth of the microorganism strains employed in the present invention as long as it contains the essential nutrients for the growth thereof. Such nutrients are well known in the art and include substances such as a carbon source, a nitrogen source, inorganic compounds and the like which are utilized by the microorganism employed in appropriate amounts. As discussed above, the microorganisms of the invention have been adapted to utilize highly selected carbon compounds for the energy source and carbon requirements for their growth. Accordingly, the microorganisms used herein grow and survive in an aqueous nutrient medium containing a hydrocarbon or a mixture of hydrocarbons as the main carbon source. Such hydrocarbons include straight and branched-chain paraffins (alkanes) ranging from gaseous alkanes, such as methane and propane, liquid or semi-solid alkanes, such as n-pentane, n-octane, n-decane, n-dodecane, n-hexadecane, isopentane, isooctane, and including long-chain solid paraffins having high melting points, cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, naphthalene, phenanthrenes, anthracenes, etc., and mixtures thereof as well as mixed hydrocarbons such as kerosene, light oils, heavy oils, paraffin oils, petroleum crudes, jet fuels, gasoline, etc. Other organic subtances, such as alcohols, aldehydes, ketones, organic acids, phenolics and aromatic heterocyclic and carbocyclic compounds, are utilized by the present microorganisms.

Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc., may be used in the culture medium along with the hydrocarbon. These substances may be used either singly or in mixtures of two or more.

As a nitrogen source, various kinds of inorganic or organic salts or compounds, such as urea or ammonium salts such as ammonium chloride, ammonium sulfate, ammonium nitrate, ammonium phosphate, etc., or one or more than one amine acid mixed in combination, or natural substances containing nitrogen, such as corn-steep liquor, yeast extract, meat extract, fish meal, peptone, bouillon, casein hydrolysates, fish solubles, rice bran extract, etc., may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, sodium chloride, ammonium nitrate, etc.

The microorganisms employed in the present invention are cultured under aerobic conditions, such as aerobic shaking of the culture or with stirring and aeration of a submerged culture, at a temperature of, for example, about 4° to 37° C. and at a pH of, for example, about 6 to 8. The microorganisms are harvested at an appropriate time and are used as discussed below.

DETAILED DESCRIPTION OF THE PREFERRED EMBODIMENTS

The process of the invention can be used to remove petroleum and petroleum fractions from locations wherever its presence constitutes a deleterious pollution. Thus, with this process, it becomes possible to clean up oil spillage on the open sea, on sandy beaches, shingle beaches, rocky coast lines, harbors and inland waters, or oily waste effluent materials discharged from industrial plants. There is no restriction as to the fraction of petroleum which is degradable. Accordingly, the process can be employed to degrade alkanes, alkenes, phenols, naphthalenes, phenanthrenes, anthracenes, organic acids, aldehydes, ketones, esters and the like, i.e., organic carbon-containing compounds, including acyclic, alicyclic, heterocyclic and carbocyclic compounds.

As examples, the following oils and oil mixtures have been degraded completely or essentially completely using the process of the present invention:

| Oil Sample No. 1 | |
|---|---|
| Quaker State Oil (SAE 20-20W) | 950.0 ml. |
| Kerosene (Amoco) | 200.0 ml. |
| Gasoline (Esso "Regular") | 50.0 ml. |
| Paraffin (Gulf), solid | 50.0 g. |
| * Creolin | 1.25 ml. |
| Sulfur, yellow powder | 2.5 g. |
| Oil Sample No. 2 | |
| Kirkuk Crude (Iraq) | 35.7 |
| Pour point | −15° F. |
| Sulfur | 1.95% |
| Conradson carbon, Wt% | 3.26 |
| Viscosity at 100°F., cs | 4.78 |
| Oil Sample No. 3 | |
| JP-4 jet fuel | |
| Oil Sample No. 4 | |
| Bunker C fuel | |
| Oil Sample No. 5 | |
| Venezuelan crude oil | |

*a general purpose disinfectant made by Plough, Inc., consisting of coal tar, neutral oils, phenols, soap and inert ingredients (10% water).

Thus, the present invention can also be used to clean, for example, storage tanks or the hold compartments of oil tanker vessels in view of the wide diversity of petroleum substances degradable by means of the microorganisms described herein.

A preferred mode of combating oil spillage will now be described. Any one of the microorganisms disclosed herein may be used alone, or a mixture of two, three or all six may be employed, depending upon the particular circumstances encountered. Moreover, mixtures of one or more of the microorganisms disclosed herein may be used together with one or more of the novel microorganisms disclosed in said parent application Ser. No. 43,226 or the microorganisms disclosed in copending application Ser. No. 313,629, filed on Dec. 11, 1972. The microorganisms are seeded or dispersed over an oil-spilled area by means of boats, aircraft or other vehicles as appropriate. The mixture employed preferably includes a cellulose absorbent to prevent the oil from spreading. The cellulose absorbent is, for example, straw, bagasse, pine bark mulch, sawdust or other forest or agricultural products. Additive nutrients for the microorganisms are also mixed with the absorbent, such as cottonseed protein and inorganic salts of nitrogen and phosphorus as an example. Included in the mixture is the microorganism or mixture of microorganisms chosen for the particular cleanup operation. The work of oil degradation will begin at once upon spreading the mixture of the oil surface. The evidence of oil degradation becomes increasingly more evident each day. Complete degradation may take place as early as one week, but may take longer depending upon the amount of oil spillage and the temperature conditions. It is not absolutely necessary to use an absorbent, and the Nocardia microorganisms of the invention can be used as a slurry or in a dry powdery or pelletized form with added nutrients.

When the number of gallons of oil spilled is unknown, as from an off-shore well, the concentration of microorganisms added to the mixture of absorbent and nutrient supplements should be about 2 lbs. of wet packed cells per acre. When the number of gallons of oil in an oil spill is known, the amount of mixture of microorganisms, absorbent and additive nutrients employed should be at least sufficient to provide a thin seeding of several percent (W/V). About 1 to 5 percent is desirable. Amounts substantially less than this are slower acting although still effective, while substantially greater amounts are unnecessary except in special situations.

The process of the invention is a purely biological process in which the microorganisms degrade the crude petroleum or organic wastes and utilize the hydrocarbons as the carbon source for growth. The process results in the conversion of many tons of spilled oil into many tons of microbial cells which, in turn, become food for plankton, shellfish and other marine life. Since the microorganisms employed herein are terrestrial forms, they will die off when the oil is all consumed. Hence, there is no need for cleanup operations after the microbial degradation has been completed.

The process of the invention can be applied to open waters and to beaches. It is particularly useful on rocky coasts where vehicles on wheels cannot traverse. The use of forest products such as sawdust, pine bark, wood flour, cotton linters, cottonseed hulls and/or straw, bagasse, marsh hay, shredded paper, etc., is used to help localize the oil spill and to prevent it from spreading further. The addition of, for example, cottonseed protein or soybean milling by-products together with added nitrogen and phosphorus nutrients provides a balanced nutritional medium for the microorganisms. Since all of these additives are of agricultural or forest sources, they are safe and non-toxic. Additionally, these substances provide a matrix upon which the added mixture of microorganisms proceeds to degrade all of the absorbed oil.

EXAMPLES OF THE INVENTION

The following examples are given merely as illustrative of the present invention and are not to be considered as limiting.

EXAMPLE 1

Erlenmeyer flasks of 250 ml. capacity were each filled with 100 ml. of the standard Bushnell-Haas medium containing either Kirkuk Mideast crude oil (0.2% by volume) or benzoic acid (0.5% by volume) as the sole carbon source as shown below, and each flask was inoculated with 0.1 ml. of a young broth culture of the microorganisms listed below. Aerobic shaking of the flasks was then conducted for 66 hours at 180 rpm at room temperature (28°C.). Thereafter, each flask was diluted by tenfold and plated out on a Petri dish, and the resulting titers, i.e., number of colony-forming units per milliliter (cfu/ml) was observed and recorded. The results are shown in the following tables:

Table 1

Kirkuk Mideast crude oil as sole carbon source

| Test Organism | Growth at 66 Hours |
| --- | --- |
| Nocardia asteroides 1092* | $6 \times 10^4$ |
| Nocardia globerula 1039 ATCC 21505 | $4 \times 10^4$ |
| Nocardia sumatrae 1154** | $1.1 \times 10^4$ |
| Nocardia carneus 1113 | $18 \times 10^1$ |
| Nocardia pelletieri 1401* ATCC 14816 | 0 |
| Nocardia brasiliensis 1402* ATCC 19019 | 0 |

Table 2

Benzoic acid as sole carbon source

| Test Organism | Growth at 66 Hours |
| --- | --- |
| Nocardia globerula 1039 ATCC 21505 | $9 \times 10^4$ |
| Nocardia asteroides 1092* | $4.6 \times 10^3$ |
| Nocardia sumatrae 1154** | $1.1 \times 10^3$ |
| Nocardia carneus 1113 | $1 \times 10^1$ |
| Nocardia pelletieri 1401* | 0 |
| Nocardia brasiliensis 1402* | 0 |

*pathogenic microorganism
**also known as *Actinomycetes sumatrae* or *Nocardia cuniculi*, known pathogens The cell growth shown in the above Tables is a direct measure of the growth of each indicated microorganism on Kirkuk Mideast crude oil or benzoic acid as the sole carbon source. Kirkuk Mideast crude oil was chosen as a substrate because of its complex composition, basically being an oil of high sulfur content straight-chain alkanes, phenols, naphthenics, anthracenes, phenanthrenes, etc., whereas benzoic acid was chosen as a substrate since it is an aromatic compound and is a well-known biocide and preservative.

It is well known that relatively small differences in the ability of a microorganism to degrade substrates such as crude oil or an aromatic such as benzoic acid can have a significant effect in determining whether a procedure for the microbial degradation of petroleum will be commercially and economically feasible. The Nocardia microorganisms disclosed and claimed in this application have the capacity to permit the practical application of the described process for the microbial degradation of petroleum, while demonstrating a surprisingly broad spectrum of degradation capability.

EXAMPLE 2

In different runs, *Nocardia corallina* ATCC 21504, *Nocardia globerula* ATCC 21505, *Nocardia globerula* ATCC 21506, *Nocardia opaca* ATCC 21507, *Nocardia rubra* ATCC 21508 and *Nocardia paraffinae* ATCC 21509 were each added to the first tank of a pilot plant facility containing 40 liters of a mixture of water and a waste oil effluent from an aluminum rolling mill. The microorganisms were added to the tank (in the amount of 2% by volume with respect to the volume of mixture to be degraded) in a slurry form mixture containing cottonseed protein and inorganic salts of nitrogen and phosphorus. Aeration is provided to the mixture in the tank, and degradation is permitted to continue for approximately 60 hours at room temperature. At the end of 60 hours, the mixture is transferred to a second tank containing an equal amount of water, thereby providing about a 50 percent dilution. Aeration is continued, and microbial degradation is permitted to continue in the second tank for 36 hours for a total of about 96 hours (about 4 days). At the end of 96 hours, approximately 50 percent of the resulting mixture in the second tank is transferred into an equal volume of water contained in a third tank. Degradation is allowed to proceed in the third tank for an additional 24 hours for a total elapsed time of about 120 hours or approximately 5 days. Hexane extracts taken from the third tank show that no oil is present in this tank after degradation has been permitted to proceed for 5 days. The mixture in the third tank is then circulated through a filter to remove any solids, such as cell mass, from the treated effluent. The resulting water is clean and safe for marine life and may be discharged into a lake or stream, as desired. Fish, benthic life, microscopic life and aquatic plants placed in the resulting clean, degraded effluent grow, survive and proliferate in a natural manner, thus indicating that the polluted water has been degraded to a habitable, ecologicallyclean environment.

The above experiment has been repeated with various oily waste effluents using each of the Nocardia microorganisms of the invention as well as with mixtures of two, three, four, five or all six of these organisms with the same result. Various mixtures of the Nocardia microorganisms of the invention with other petroleum-degrading microorganisms as disclosed in said copending applications have also been found to be effective in obtaining the objective degradation.

EXAMPLE 3

An outdoor oil spillage cleanup field test was conducted on the eastern coast of Virginia. Two lagoons were selected. The test lagoon was roughly circular and about 75 feet in diameter with a 12-foot throat. The diameter varies somewhat with the tide. The test bed was a framework of boards 8 × 8 ft. square, the boards being 1 inch × 12 inches with flotation on the sides. The control lagoon was about 100 feet wide with a 20-foot wide throat. Both lagoons, separated by about 350 feet of land, are ideal test sites. Crude petroleum (3.1 liters) was put into both the test bed and into the control bed.

A slurry of a mixture comprising *Nocardia corallina* ATCC 21504, *Nocardia globerula* ATCC 21505, *Nocardia globerula* ATCC 21506, *Nocardia opaca* ATCC 21507, *Nocardia rubra* and *Nocardia paraffinae* ATCC 21509 was added to 7 lbs of straw, 3 lbs of bagasse and 4 ½ lbs of cottonseed protein. The mixture was then strewn into the test bed. The control bed was left intact with the added oil.

The test and control site were checked three days later. The oil in the test bed was essentially all degraded. The oil in the control bed was essentially unchanged. Wet mounts of samples taken from the test beds showed the presence of protozoa in the sample from the test bed, but none in the sample from the control bed. There were also microscopic green algae in the test sample, but none in the control.

On the sixth day, the oil in the test bed had been degraded to an extent of more than 95 percent, while there was substantially no change in the control bed. Again, wet mounts of samples taken from the test beds showed the presence of microscopic green algae and protozoa in the test bed sample, but none in the control bed sample.

Hence, the oil in the test bed was substantially degraded and the marine life therein was once again abundant. However, in the control bed where no microorganisms were placed, the oil slick remained and substantially destroyed all of the marine life originally present therein.

Similar results are obtained when *N. corallina* ATCC 21504, *N. globerula* ATCC 21505 and 21506, *N. opaca* ATCC 21507, *N. rubra* ATCC 21508 and *N. paraffinae* ATCC 21509 are used either alone or in mixtures with each other or with other petroleum-degrading microorganisms in the test.

It thus can be seen that the present invention provides a desirable and advantageous way for degrading and cleaning up petroleum or oily wastes by means of microbial degradation, so as to restore the oil-polluted area to a habitable and ecologically clean environment. This procedure is carried out safely and relatively economically without any harm whatsoever to human, animal or marine life.

It is to be understood that the present invention embraces the use not only of the disclosed novel Nocardia microorganisms, but is also includes the use of mutants produced therefrom, provided that they perform the same function. It is to be further understood that the invention includes the use of subcultures obtained by various standard microbiological techniques. Such mutants and/or subcultures may differ in certain respects from the above-described new strains, but will work to degrade petroleum in approximately the same manner as disclosed above.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for the microbial degradation of aqueous polluting petroleum and oily wastes which comprises treating the petroleum or oily waste with at least one microorganism selected from the group consisting of *Nocardia corallina* ATCC 21504, *Nocardia globerula* ATCC 21505, *Nocardia globerula* ATCC 21506, *Nocardia opaca* ATCC 21507, *Nocardia rubra* ATCC 21508 and *Nocardia paraffinae* ATCC 21509, and mutants thereof, in an aqueous system for a sufficient time until the treated petroleum oily waste has been substantially degraded.

2. The process of claim 1, wherein said microorganism is emmployed in a dry powdery or pelletized form.

3. The process of claim 1, wherein said microorganism is mixed with a cellulosic material.

4. The process of claim 1, wherein said microorganism is mixed with a cellulosic material, a nitrogen source and a phosphorus source.

5. The process of claim 4, wherein said nitrogen source is cottonseed protein.

6. The process of claim 1, wherein said microorganism is employed in a slurry or wet-packed form.

7. The process of claim 1, wherein said microorganism is *Nocardia corallina* ATCC 21504.

8. The process of claim 1, wherein said microorganism is *Nocardia globerula* ATCC 21505.

9. The process of claim 1, wherein said microorganism is *Nocardia globerula* ATCC 21506.

10. The process of claim 1, wherein said microorganism is *Nocardia opaca* ATCC 21507.

11. The process of claim 1, wherein said microorganism is *Nocardia rubra* ATCC 21508.

12. The process of claim 1, wherein said microorganism is *Nocardia paraffinae* ATCC 21509.

* * * * *